(12) United States Patent
Takeo

(10) Patent No.: US 10,719,589 B2
(45) Date of Patent: Jul. 21, 2020

(54) JOB DISPLAY CONTROL FOR AN IMAGE FORMING APPARATUS

(71) Applicant: CANON KABUSHIKI KAISHA, Tokyo (JP)

(72) Inventor: Akinori Takeo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/947,637

(22) Filed: Apr. 6, 2018

(65) Prior Publication Data

US 2018/0300463 A1    Oct. 18, 2018

(30) Foreign Application Priority Data

Apr. 12, 2017 (JP) ................................. 2017-079061

(51) Int. Cl.
*G06F 21/31* (2013.01)
*G06F 3/12* (2006.01)
*G06F 21/60* (2013.01)
*G06F 21/62* (2013.01)

(52) U.S. Cl.
CPC ............ *G06F 21/31* (2013.01); *G06F 3/1203* (2013.01); *G06F 3/1222* (2013.01); *G06F 3/1238* (2013.01); *G06F 3/1273* (2013.01); *G06F 3/1279* (2013.01); *G06F 21/608* (2013.01); *G06F 21/6218* (2013.01); *G06F 2221/2101* (2013.01); *H04N 2201/3202* (2013.01)

(58) Field of Classification Search
None
See application file for complete search history.

(56) References Cited

U.S. PATENT DOCUMENTS

| | | | | |
|---|---|---|---|---|
| 8,970,874 | B2 * | 3/2015 | Hiruma | G06F 21/6245 358/1.15 |
| 2007/0067680 | A1 * | 3/2007 | Harada | G06F 21/608 714/45 |
| 2007/0103715 | A1 * | 5/2007 | Nakata | G06F 3/1203 358/1.14 |
| 2013/0293921 | A1 * | 11/2013 | Aizono | H04L 9/32 358/1.14 |
| 2013/0308156 | A1 * | 11/2013 | Kakutani | G06K 15/4095 358/1.14 |
| 2014/0211240 | A1 * | 7/2014 | Maki | G06F 3/1222 358/1.14 |
| 2018/0136884 | A1 * | 5/2018 | Ikari | G06F 3/1222 |

FOREIGN PATENT DOCUMENTS

JP     2007-87002 A     4/2007

* cited by examiner

*Primary Examiner* — Miya J Williams
(74) *Attorney, Agent, or Firm* — Canon U.S.A., Inc. IP Division

(57) ABSTRACT

When a CPU of an MFP displays a job history, if a login user is a coin user and view setting of job history of the coin user is OFF, the CPU performs control not to display job information corresponding to the logged in user in the job history. If the logged in user is an ID user, the CPU displays job information corresponding to the logged in user in the job history.

10 Claims, 8 Drawing Sheets

JOB DISPLAY CONTROL FOR AN IMAGE FORMING APPARATUS

BACKGROUND

Field

The present disclosure relates to a display control of job history in an image forming apparatus.

Description of the Related Art

In recent years, an image forming apparatuses have been installed in many public facilities, such as libraries, as well as in places such as convenience stores. These image forming apparatuses are typically connected with a coin vender for users to pay a fee to use the features, such as copying, of the image forming apparatus.

When an owner (a staff member or the like at an installation site of the image forming apparatus) uses the image forming apparatus installed with a coin vender, the owner typically disables collection of a fee by the coin vendor before using the image forming apparatus.

To improve operability in such a case, an operation mode called half-public has gradually been implemented. In a school or the like, a student logs into the image forming apparatus through the coin vender as a coin user without specifying an actual user. A staff member however, uses the image forming apparatus by logging in from an operation unit without using the coin vender. This is a use case where one image forming apparatus is effectively used.

The job history of the image forming apparatus includes a job name and the like. Since job content can be estimated from information of the job history, it is not preferable in terms of security that just anybody can refer to the job history. In this regard, a conventional technique related to job history viewing is described in Japanese Patent Laid-Open No. 2007-87002. In Japanese Patent Laid-Open No. 2007-87002, a technique is proposed that can set a mode where no job history is displayed and a mode where only a job history of a user who is logged in is displayed, and therefore can control the apparatus not to enable the user to refer to job history of another person.

In the conventional technique, if the mode where only the job history of the logged in user is displayed is set, after a user (a staff member or the like) who does not use the coin vender logs in, only the job history of the user who is logged in can be referred to. Thus, a user who does not use the coin vender can confirm the user's own job history. However, a user (a student or the like) who uses the coin vender logs in as a coin user without specifying an actual user. Therefore, a user (a student or the like) who uses the coin vender can refer to a job history of another user (another student or the like) who has used the coin vender, which causes a concern that it is not preferable in terms of security.

SUMMARY

Aspects of the present disclosure provide a mechanism that achieves improved security of and convenience in accessing job histories even when both fixed users and a large number of unspecified users use the same image forming apparatus.

An aspects of the present disclosure includes an image forming apparatus including a storing unit configured to job information of an executed job in association with a user, an authentication unit configured to perform user authentication, and a control unit configured to limit display of stored job information associated with a user who has paid a fee to the charging device, display stored job information associated with an authenticated user, and limit display of stored job information associated with a user other than the authenticated user.

Further features will become apparent from the following description of exemplary embodiments (with reference to the attached drawings).

DESCRIPTION OF THE EMBODIMENTS

Hereinafter, an embodiment will be described with reference to the drawings.

Figure 1:
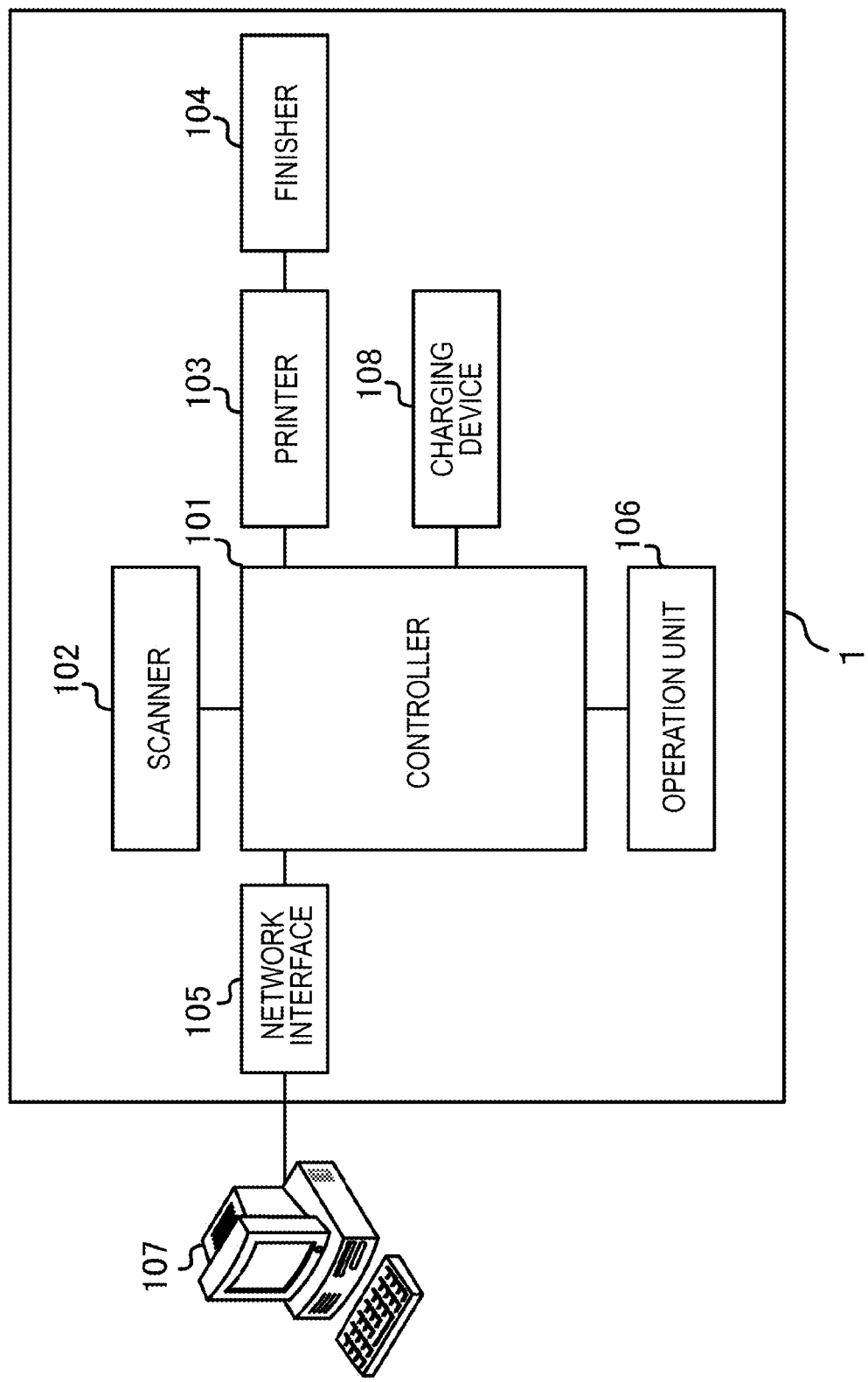
FIG. 1 is a diagram illustrating a configuration of an image forming apparatus of an embodiment of the present disclosure.

FIG. 1 is a diagram illustrating an example of a configuration of an image forming apparatus of an embodiment of the present disclosure.

Figure 2:
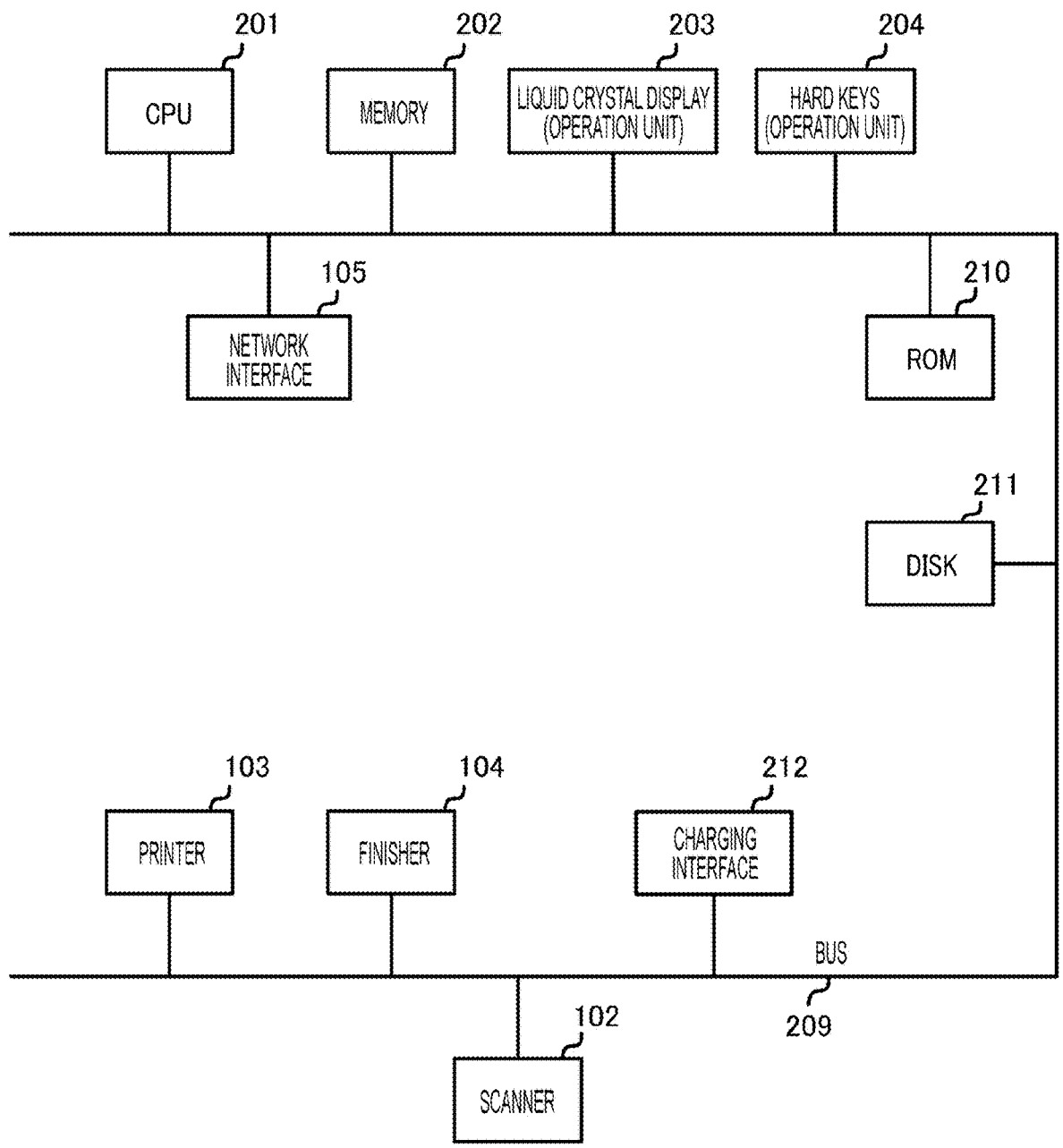
FIG. 2 is a diagram illustrating a hardware configuration of a controller of the image forming apparatus of the embodiment.

An MFP (Multi-Function Peripheral) 1 is an example of the image forming apparatus of the present embodiment. A controller 101 is a controller that controls the MFP 1 and includes a hardware configuration as illustrated in FIG. 2.

A scanner 102 is a device that reads an image from an original document and is controlled by the controller 101. A printer 103 is a printer engine that performs image formation on a recording medium (for example, a sheet such as a piece of paper) and is controlled by the controller 101. A finisher 104 is connected to the printer 103. The finisher 104 performs post-processing on a recording medium outputted from the printer 103. For example, the finisher 104 can staple together a plurality of recording media outputted from the printer 103. The finisher 104 is also controlled by the controller 101.

A network interface 105 provides bidirectional communication with a network (for example, Ethernet) to the controller 101. The network interface 105 can be connected to a personal computer (PC) 107 over the network. The controller 101 provides a remote UI to the PC 107 through the network, where the MFP 1 can be used via the remote UI.

A user interface 106 includes a LCD display, a touch panel, hardware keys, and the like. The user interface 106 displays information from the controller 101 and transmits an instruction from a user to the controller 101.

A charging device 108 is a coin vender for collecting a fee that a user is charged to use the MFP 1 (a usage fee of the MFP 1).

FIG. 2 is a diagram illustrating a hardware configuration of the controller 101.

The controller 101 includes a CPU 201, a memory 202, a ROM 210, and a DISK 211. The CPU 201 is connected to the memory 202, a liquid crystal display 203 and hardware keys 204 included in an operation unit 106, the ROM 210, the DISK 211, and the like through a bus 209.

Various programs executed by the CPU 201 and data are stored in the ROM 210 and/or the DISK 211 (storage medium) such as a hard disk or a solid-state drive. These programs and data are sequentially read out to the memory 202 as needed and executed by the CPU 201. The DISK 211 can be attachable to and detachable from the MFP1 or can be integrated with the MFP 1. The programs can be downloaded from another MFP or a server through a network and stored in the DISK 211.

While there are several types of memory, including a volatile memory such as a DRAM and a non-volatile memory such as a SRAM, the memory 202 can include functions of both the volatile and non-volatile memories. A configuration can be employed in which the memory 202 includes the function of volatile memory and the DISK 211 includes the function of non-volatile memory. The memory 202 can include a detachable memory medium.

The CPU 201 controls data display on the display 203 and also controls user input from the hardware keys 204 or a touch panel (not illustrated) attached to the liquid crystal display 203. Inputted information is stored and accumulated in any one of the memory 202, the DISK 211, and the CPU 201 and used for various processing operations.

The bus 209 is connected with the network interface 105. The CPU 201 performs network communication through the network interface 105.

The bus 209 is also connected with a charging interface 212, so that the charging device 108 illustrated in FIG. 1 can be connected to the bus 209. The CPU 201 performs communication for collecting a fee by reading or writing data, such as remaining money, from the charging interface 212.

The bus 209 is also connected with the printer 103, the finisher 104, the scanner 102, and the like. The CPU 201 performs operations such as printing and scanning and acquires various statuses by reading and writing data from and to the printer 103, the finisher 104, and the scanner 102.

The controller 101 can input image data from the scanner 102 or the network interface 105 and store the image data in the DISK 211 and/or the memory 202 in the controller 101. When image data is stored in a detachable memory 202 in advance and the memory 202 is attached to the controller 101, the controller 101 can obtain the image data. The printer 103, the finisher 104, and the scanner 102 do not need to be located internal to the MFP 1. They can be provided as individual peripheral devices on a network, which are controlled by the controller 101 of the MFP 1.

Figure 7:
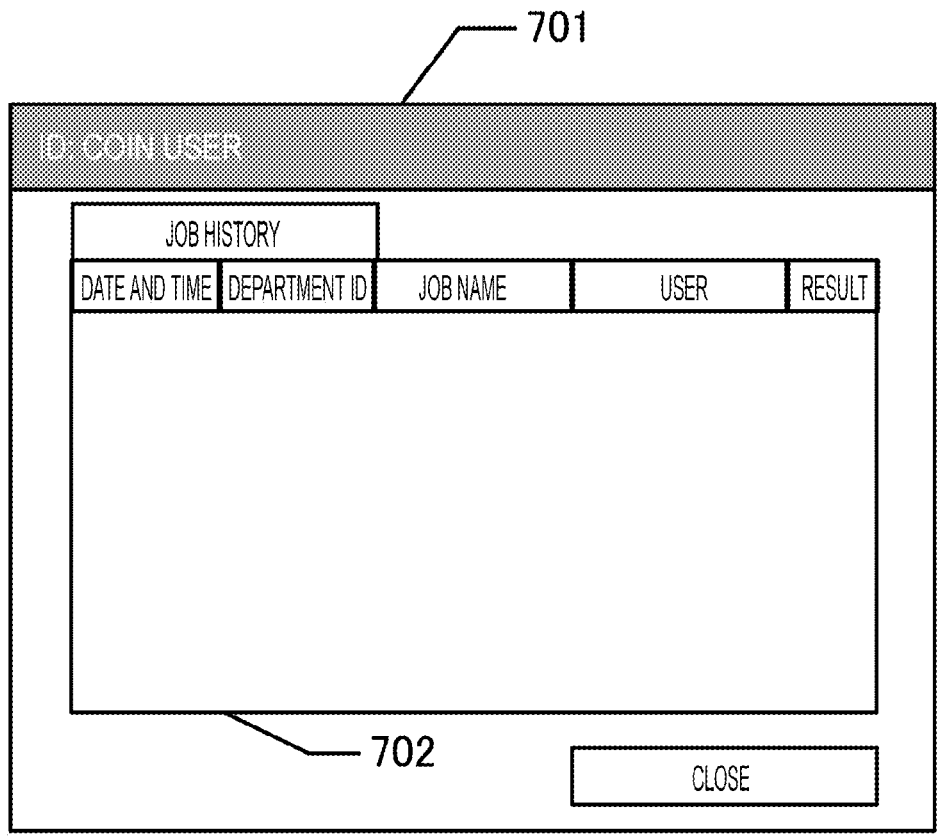
FIG. 7 is a diagram illustrating an example of a job history view screen of the embodiment.
Figure 7:
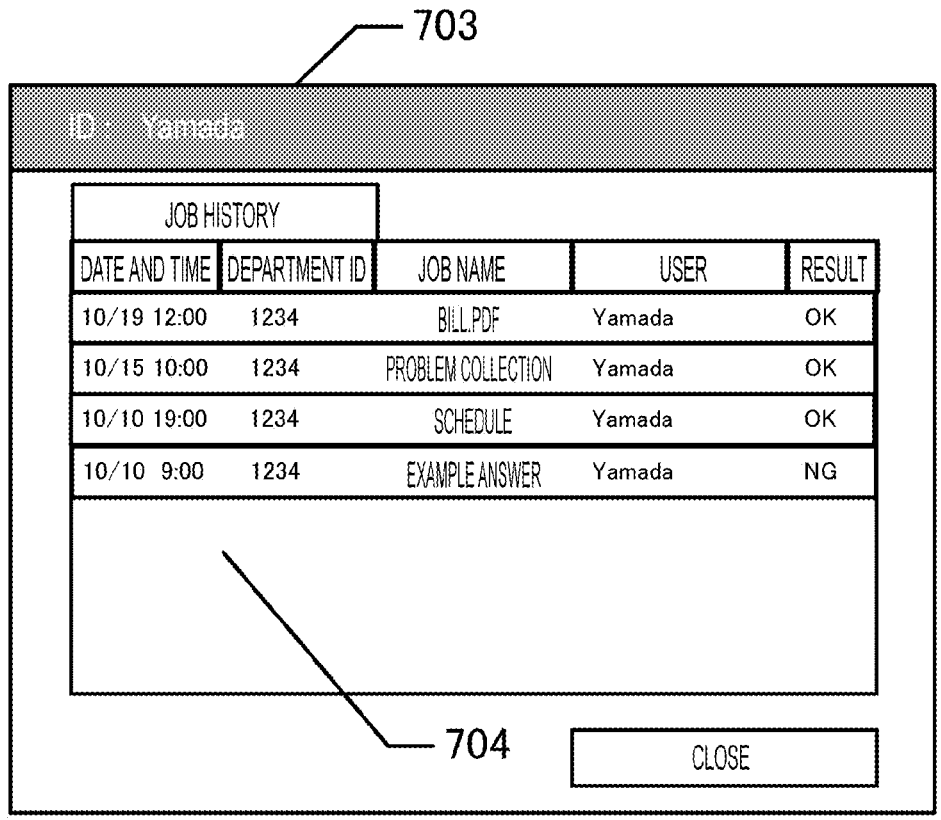

It is assumed that job information of jobs performed by the MFP 1 is stored in the DISK 211. The job information includes an execution date and time of the job, a department to which a user who requested execution of the job belongs, a job name, a name of the user who requested execution of the job, an execution result, and the like. The job information can be associated with the user. The job information can also be displayed as a job history corresponding to a logged in user, as illustrated in FIG. 7 described below.

Figure 3:
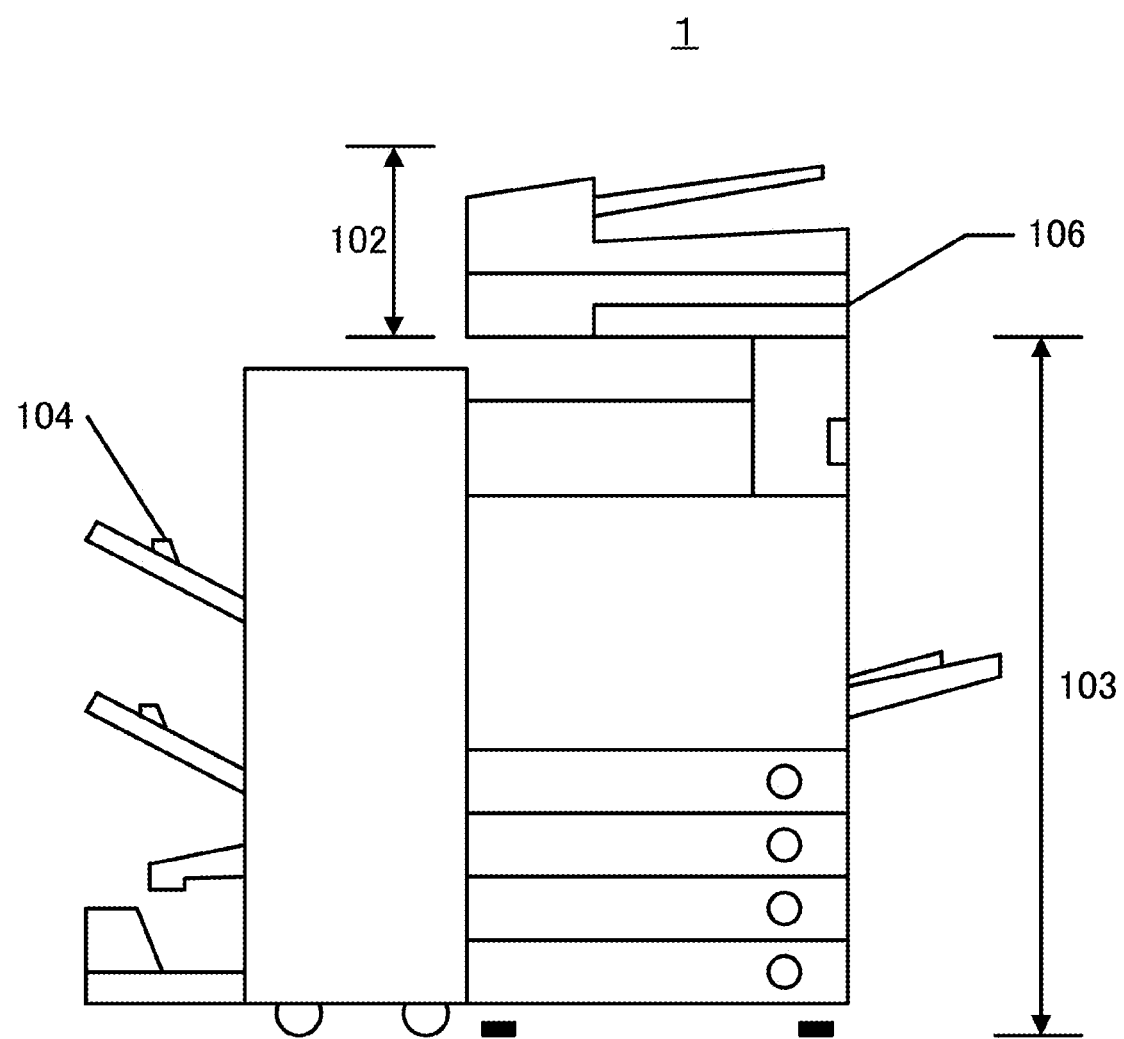
FIG. 3 is a diagram illustrating an overview of the image forming apparatus of the embodiment.

FIG. 3 is a diagram illustrating an overview of the MFP 1.

As illustrated in FIG. 3, the scanner 102, which is an image input device, converts an image on an original document into an electrical image data by illuminating the image on a piece of paper, which is the original document, and causing a CCD line sensor to scan. The scanner 102 performs color determination, size determination, and the like of the original document from the electrically converted image data.

The printer 103, which is an image output device, is a unit that converts image data into an image on a paper sheet. The printer 103 performs printing on the paper sheet and outputs the paper sheet to the finisher 104. The finisher 104, which is a post-processing device, performs folding processing, such as stapling and bookbinding, on the paper sheet printed by the printer 103 and outputs the paper sheet. Starting and stopping of the printing operation and the post-processing operation are initiated by an instruction from the CPU 201 of the controller 101. Each paper discharge bin of the finisher 104 includes a paper detection sensor 304 and can detect the presence or absence of a paper sheet in the paper discharge bin.

Figure 4:
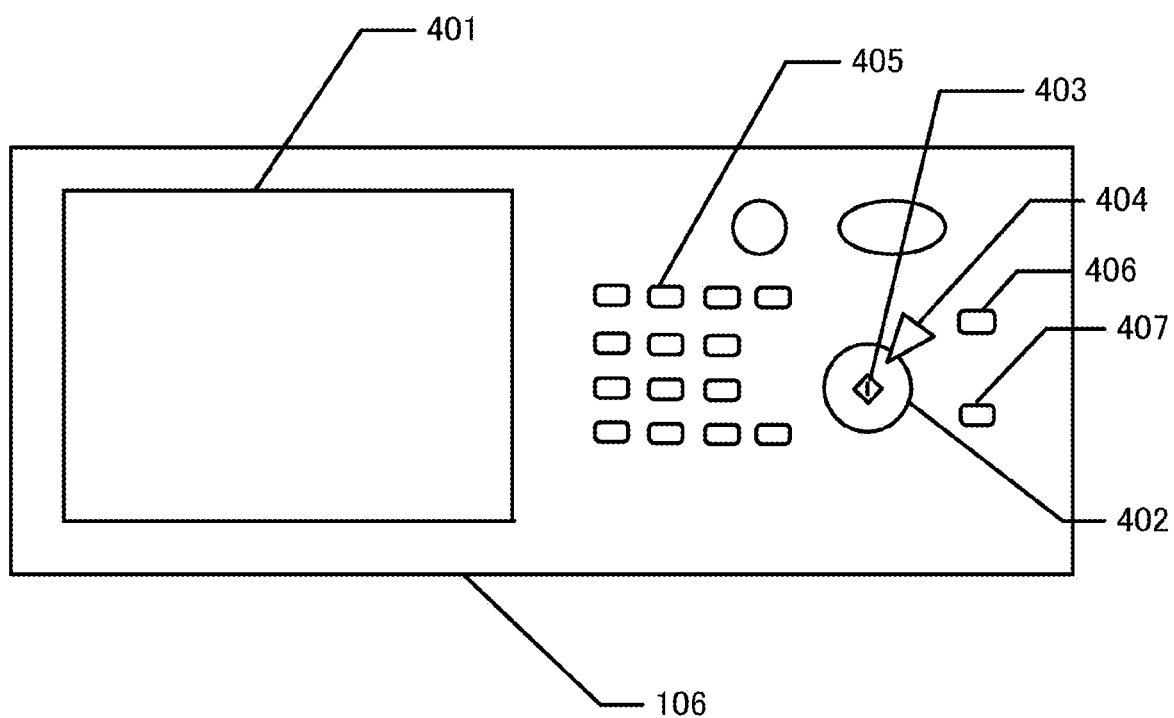
FIG. 4 is a diagram illustrating a configuration of an operation unit of the image forming apparatus of the embodiment.

FIG. 4 is a diagram illustrating a configuration of the operation unit 106.

A liquid crystal display unit 401 includes the liquid crystal display 203 and a touch panel sheet (not illustrated) attached to the liquid crystal display 203. The liquid crystal display unit 401 displays an operation screen of a system, software keys, and the like. When a displayed softkey is touched, the liquid crystal display unit 401 transmits position information of the softkey to the CPU 201 of the controller 101.

Keys 402 to 407 are the hardware keys 204. A start key 402 is used to initiate a reading operation of an image of original document or the like. A two-color LED 403 of green and red is located at the center of the start key 402. The color of the LED 403 indicates whether the start key 402 can be used. A stop key 404 stops an operation currently being performed. A numeric keypad 405 includes numeric and character buttons and indicates setting of the number of copies and switching of the screen of the liquid crystal display unit 401. A user mode key 406 is pressed to perform equipment setting. A job history view key 407 is pressed to view job history.

The equipment setting that can be set by the user mode key 406 includes setting for displaying only a logged in user's own job history as a job history. An administrator or the like can set the setting for displaying only the logged in user's own job history to ON (enabled) or OFF (disabled) from a setting screen (not illustrated) that is displayed and controlled on the liquid crystal display unit 401 by the CPU 201 based on pressing of the user mode key 406. The equipment setting that can be set by the user mode key 406 also includes view setting of job history, described below with respect to FIG. 6, and the like. Setting information of the equipment setting that can be set by the user mode key 406 is stored in a non-volatile memory area in the memory 202 and/or the DISK 211.

Figure 5:
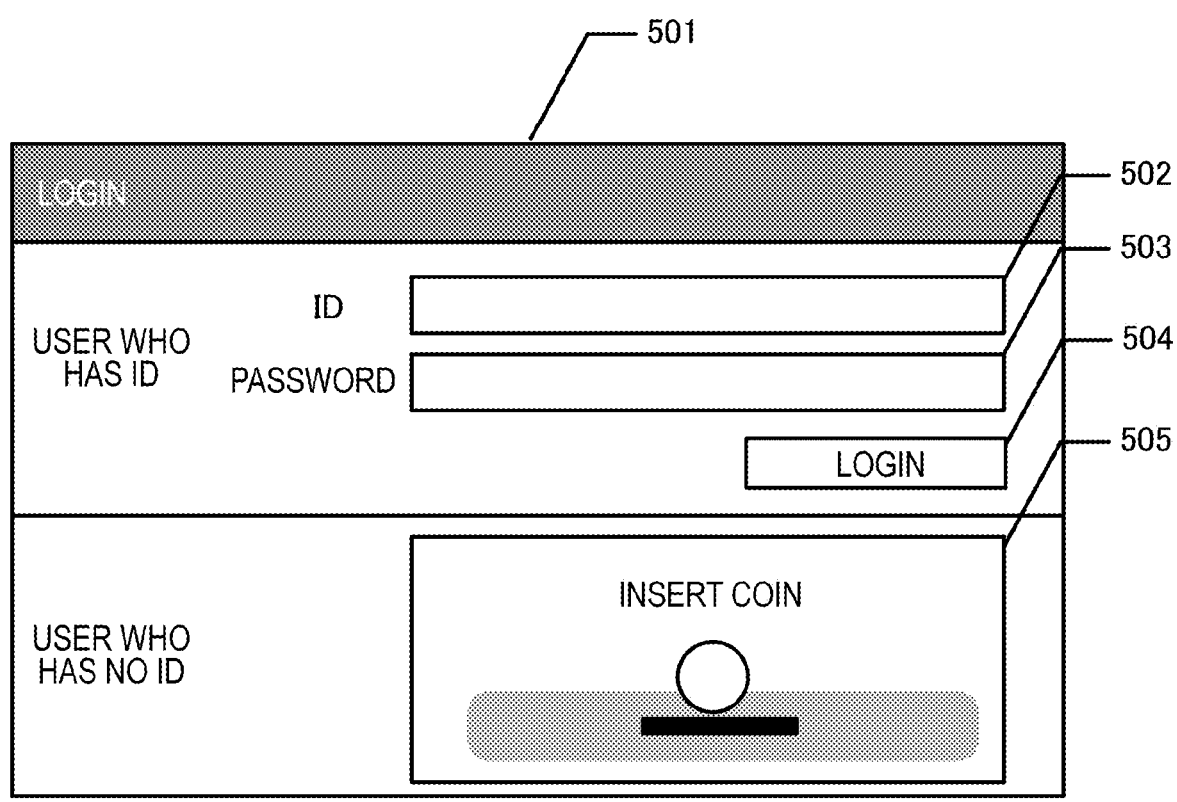
FIG. 5 is a diagram illustrating an example of a login screen of the embodiment.

FIG. 5 is a diagram illustrating an example of a login screen. Screens illustrated in FIG. 5 and FIGS. 6 and 7, described below, are displayed on the liquid crystal display unit 401 based on an instruction from the CPU 201.

On a login screen 501, an ID input box 502, a password input box 503, and a login button 504, which enable an owner of an ID to input the ID and a password, are displayed. A screen 505 for a user who does not have an ID is displayed on the login screen 501.

For example, it is assumed that data (a table of IDs and passwords) as illustrated in Table 1 is stored in either the memory 202 of the controller 101 or the DISK 211. When an ID and a password inputted into the ID input box 502 and the password input box 503 correspond to the data stored in the controller 101, the CPU 201 determines that the ID and the password are authorized (user authentication is successfully performed) and permits logging into the MFP 1.

The user who logs in by this authentication is defined as an "ID user". The ID user corresponds to a user of a type used by fixed users of the MFP 1 (a first type user). The login of the ID user can be performed using an IC card where user identification information assigned for each user in advance and the like are registered.

Login is also possible when a coin (coins or paper money) is inputted into the charging device 108. In this case, login is possible without a password. When login is performed using the charging device 108 in this way, in the present embodiment, "Coin" ID appears and is recognized as an ID different from a normal ID. A user who logs in using the charging device 108 is defined as a "coin user". The coin user is considered part of an unspecified large number of users of the MFP 1 (a second type user). A user can be logged in as a coin user by touching the charging device 108 with an e-money IC card or a smartphone. A user can also be logged in as a coin user by inserting a credit card into the charging device 108.

TABLE 1

|   | ID    | Password |
|---|-------|----------|
| 1 | Admin | abcd     |
| 2 | Asan  | cdef     |
| 3 | Bsan  | aaaa     |
| 4 | Coin  | None     |

Figure 6:
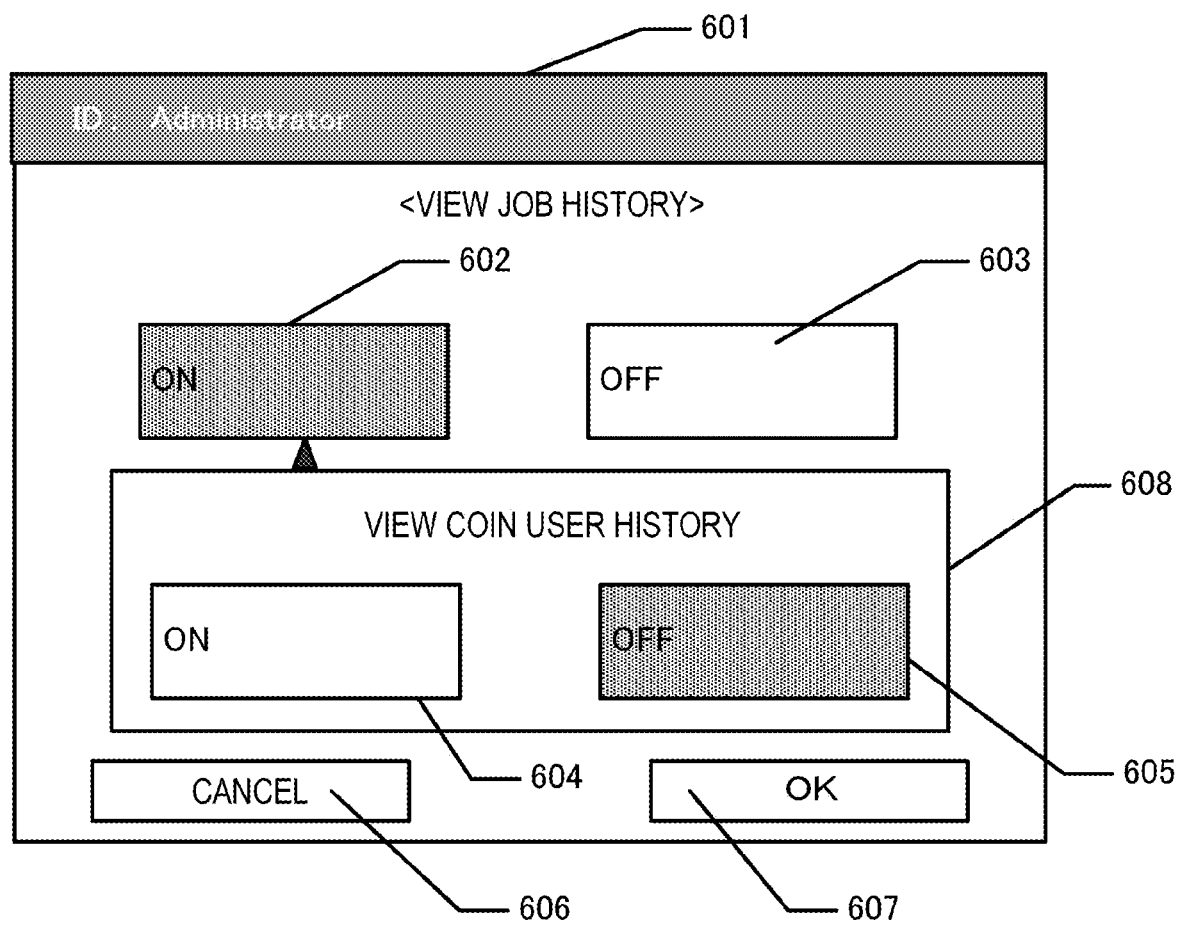
FIG. 6 is a diagram illustrating an example of a view setting screen of job history of the embodiment.

FIG. 6 is a diagram illustrating an example of a view setting screen of the job history of the present embodiment.

A job history view ON button 602 and a job history view OFF button 603 are displayed on a job history view setting screen 601. The job history view ON button 602 is a button selected when turning on (enabling) setting for displaying the job history on a job history view screen, as illustrated in FIG. 7, which is described below. The job history view OFF button 603 is a button selected when turning off (disabling) the setting for displaying the job history on the job history view screen (that is, a button to be selected when causing the job history not to be displayed on the job history view screen). For example, when an administrator selectively presses the job history view ON button 602 or the job history view OFF button 603, the administrator can select whether to display the history on the job history view screen illustrated in FIG. 7.

When the job history view ON button 602 is selected, the CPU 201 performs control to display a job history view setting screen 608 of the coin user on the job history view setting screen 601. On the job history view setting screen 608 of the coin user, a job history view ON button 604 of the coin user and a job history view OFF button 605 of the coin user are displayed. The job history view ON button 604 of the coin user is a button selected when turning on (enabling) setting for displaying the job history of the coin user on the job history view screen. The job history view OFF button 605 of the coin user is a button selected when turning off (disabling) the setting for displaying the history of the coin user on the job history view screen (that is, a button to be selected when causing the history of the coin user not to be displayed on the job history view screen). For example, when an administrator presses the job history view ON button 604 of the coin user or the job history view OFF button 605 of the coin user, the administrator can select whether to display the job history of the coin user.

An OK key 607 is a key pressed when executing the setting selected as described above. A cancel key 606 is a key pressed when cancelling the setting selected as described above. The CPU 201 stores the decided setting in either the memory 202 or the DISK 211.

FIG. 7 is a diagram illustrating an example of a job history view screen of the present embodiment. Here, it is assumed that the job history view setting of the coin user is set to OFF. It is also assumed that jobs, which have been inputted into the MFP 1 by a coin user and an ID user and have been processed in the MFP 1, are recorded as job history information in the non-volatile memory area in the memory 202 or the DISK 211.

A job history view screen 701 of the coin user corresponds to a job history view screen in a case in which the coin user logs in. When the job history view key 407 is pressed in a state in which the job history view setting of the coin user is OFF and the coin user logs in, the CPU 201 does not display contents of an execution date and time of the job, a department ID, a job name, a user name of the job, a result, and the like as a job history, as illustrated in the section denoted by 702. In other words, in this case, the CPU 201 limits display of the job history.

A job history view screen 703 of the ID user corresponds to a job history view screen in a case in which the ID user logs in. When the job history view key 407 is pressed in a state in which the job history view setting of the coin user is OFF and the ID user logs in, the CPU 201 displays contents of an execution date and time of the job, a department ID, a job name, a user name of the job, a result, and the like as a job history, as illustrated in the section denoted by 704. In an example of the job history view screen 703 of the ID user, "Yamada" logs in as the ID user and, thus, only a job history where the user is "Yamada" is displayed. Alternatively, when an ID user logs in, all job histories of ID users except for the coin user can be displayed. Whether to display only the login user's job history or other users' job histories in addition to the login user's job history can be set by the user mode key 406 as described above.

Figure 8:
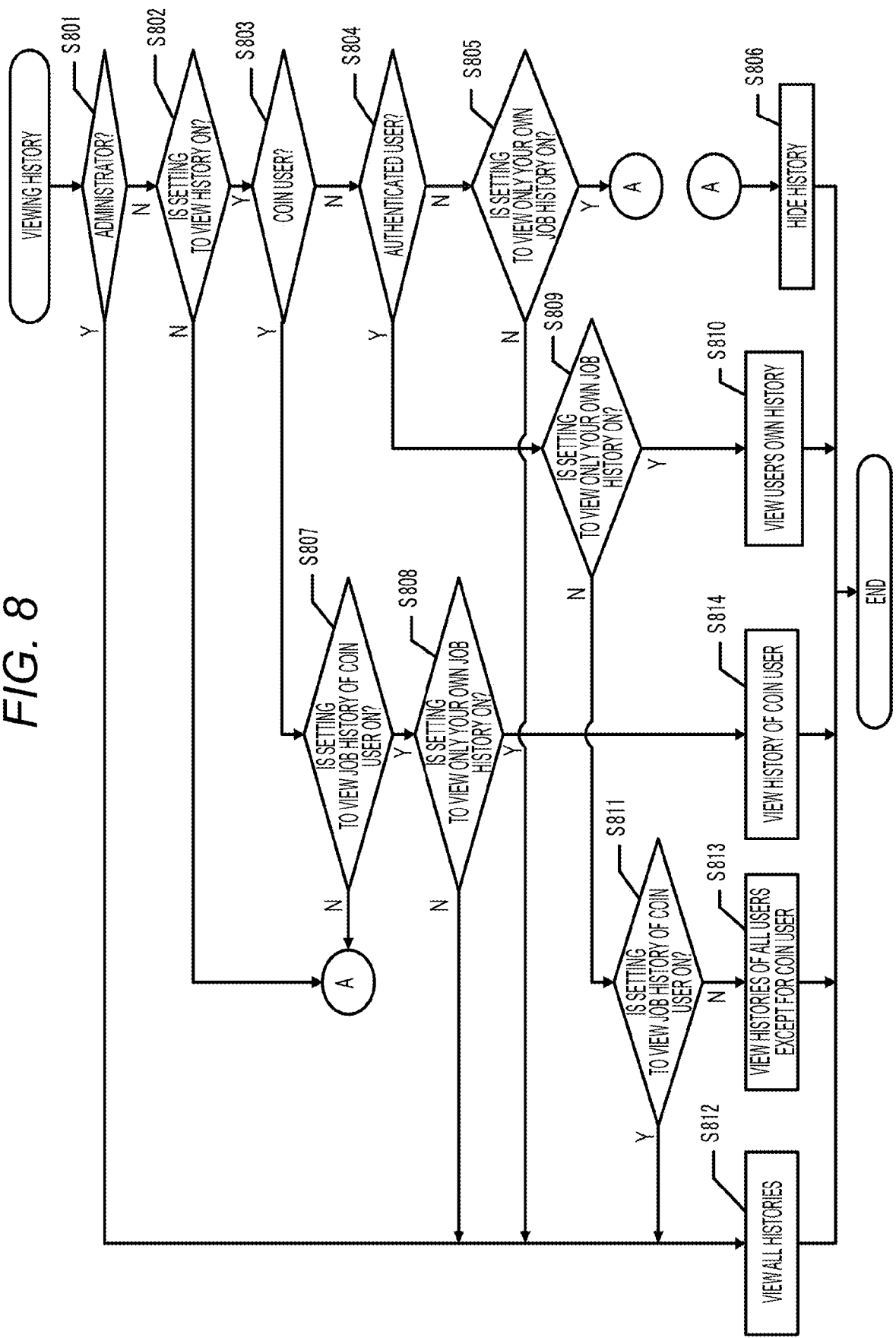
FIG. 8 is a flowchart illustrating an example of job history view processing of the embodiment.

FIG. 8 is a flowchart illustrating an example of job history view processing of the present embodiment. The processing illustrated in this flowchart is realized when the CPU 201 sequentially reads out a program and the like stored in the ROM 210 or the DISK 211 to the memory 202, and executes the program as needed.

When the CPU 201 detects pressing of the job history view key 407, the CPU 201 initiates the history view processing illustrated by the flowchart of FIG. 8. First, in S801, the CPU 201 determines whether the logged in user is an administrator user. When the CPU 201 determines that the logged in user is an administrator user (in the case of Yes in S801), the CPU 201 advances the processing to S812. In S812, the CPU 201 performs control to display job histories of all users and then ends the processing of the flowchart.

In S801 described above, when the CPU 201 determines that the logged in user is not an administrator user (in the case of No in S801), the CPU 201 advances the processing to S802.

In S802, the CPU 201 determines whether the view setting of job history described in FIG. 6 is ON. When the CPU 201 determines that the view setting of job history is not ON (is OFF) (in the case of No in S802), the CPU 201 advances the processing to S806.

In S806, the CPU 201 does not display contents of date and time, a department ID, a job name, a user, a result, and the like as illustrated by the screen 701 of FIG. 7 regarding job histories of all users, regardless of the presence or absence of job history, and ends the processing of the flowchart. In S806, the CPU 201 can perform control not to display the job histories of all users by not proceeding to a job history screen as illustrated in FIG. 7. The CPU 201 can notify a user of a reason why no history view is displayed, such as because the view setting of job history is OFF.

In S802 described above, when the CPU 201 determines that the view setting of job history is ON (in the case of Yes in S802), the CPU 201 advances the processing to S803.

In S803, the CPU 201 determines whether the logged in user is a coin user. When the CPU 201 determines that the logged in user is a coin user (in the case of Yes in S803), the CPU 201 advances the processing to S807.

In S807, the CPU 201 determines whether the view setting of job history of the coin user described in FIG. 6 is ON. When the CPU 201 determines that the view setting of job history of the coin user is not ON (in the case of No in S807), the CPU 201 advances the processing to S806 and performs control not to display contents of the job histories of all users. In this case, the CPU 201 displays the job history of the coin user where contents of date and time, a department ID, a job name, a user, a result, and the like are not displayed as a job history as illustrated by, for example, the screen 701 of FIG. 7.

In S807 described above, when the CPU 201 determines that the view setting of job history of the coin user is ON (in the case of Yes in S807), the CPU 201 advances the processing to S808.

In S808, the CPU 201 determines whether the setting for displaying only the logged in user's own job history (not illustrated) is ON, as the equipment setting that can be set by the user mode key 406 described in FIG. 4.

In S808 described above, when the CPU 201 determines that the setting for displaying only the login user's own job history is ON (in the case of Yes in S808), the CPU 201 advances the processing to S814.

In S814, the CPU 201 displays only the job history of the coin user, and then ends the processing of the flowchart. In S808 described above, when the CPU 201 determines that the setting for displaying only the login user's own job history is not ON (is OFF) (in the case of No in S808), the CPU 201 advances the processing to S812, and performs control to display the job histories of all users. When the login user is a coin user and the setting for displaying only the login user's own job history is OFF, the job histories of all users can be displayed regardless of ON/OFF of the job history view setting of the coin user.

In S803 described above, when the CPU 201 determines that the login user is not a coin user (in the case of No in S803), the CPU 201 advances the processing to S804.

In S804, the CPU 201 determines whether the logged in user is an authenticated user who has inputted an ID and a password through the login screen of FIG. 5 and has been authenticated.

In S804 described above, when the CPU 201 determines that the logged in user is an authenticated user (in the case of Yes in S804), the CPU 201 advances the processing to S809.

In S809, in the same manner as in S808 described above, the CPU 201 determines whether the setting for displaying only the logged in user's own job history is ON, as the equipment setting that can be set by the user mode key 406.

In S809 described above, when the CPU 201 determines that the setting for displaying only the logged in user's own job history is ON (in the case of Yes in S809), the CPU 201 advances the processing to S810.

In S810, as illustrated by the screen 703 of FIG. 7, the CPU 201 displays only the logged in user's own job history, and then ends the processing of the flowchart.

In S809 described above, when the CPU 201 determines that the setting for displaying only the logged in user's own job history is not ON (is OFF) (in the case of No in S809), the CPU 201 advances the processing to S811.

In S811, in the same manner as in S807 described above, the CPU 201 determines whether the view setting of job history of the coin user is ON.

In S811 described above, when the CPU 201 determines that the view setting of job history of the coin user is ON (in the case of Yes in S811), the CPU 201 advances the processing to S812, and performs control to display the job histories of all users.

In S811 described above, when the CPU 201 determines that the view setting of job history of the coin user is not ON (in the case of No in S811), the CPU 201 advances the processing to S813. In S813, the CPU 201 performs control to display the job histories of all users except for the coin user, and then ends the processing of the flowchart. In other words, even when setting for displaying job histories including job histories other than the user's own job history is enabled, it is possible not to display the job history of the coin user, which can be used by an unspecified number of users, on the history view screen of the ID user. Thereby, usage information of general users who use the MFP 1 at, for example, a convenience store or the like, is protected, usage information is prevented from being leaked by, for example, a staff member or the like, and security is improved.

When the logged in user is an authenticated user and the setting for displaying only the logged in user's own job history is OFF, the job histories of all users can be displayed regardless of ON/OFF of the job history view setting of the coin user.

In S804 described above, when the CPU 201 determines that the logged in user is not an authenticated user (in the case of No in S804), the CPU 201 determines that there is no logged in user, that is, determines that no user has logged in, and advances the processing to S805.

In S805, in the same manner as in S808 described above, the CPU 201 determines whether the setting for displaying only the logged in user's own job history is ON, as the equipment setting that can be set by the user mode key 406.

In S805 described above, when the CPU 201 determines that the setting for displaying only the logged in user's own job history is ON (in the case of Yes in S805), the CPU 201 advances the processing to S806 and performs control not to display contents of the job histories of all users.

In S805 described above, when the CPU 201 determines that the setting for displaying only the logged in user's own job history is not ON (is OFF) (in the case of No in S805), the CPU 201 advances the processing to S812, and performs control to display the job histories of all users.

As described above, a fixed user, i.e., one who does not use a coin vendor, can reference the user's own job history, while job histories of users who do use a coin vendor, i.e., unspecified user, are prevented from being referenced. Thereby, security of and convenience of use of the job history are achieved.

In the embodiment described above, when the view setting of job history of the coin user is OFF, control is performed not to display the job history of the coin user. However, in this case, the CPU 201 can perform predetermined control to display the job history of the coin user after masking partial information included in the job information (for example, information such as a job name, from which job content can be estimated). Thereby, the job content can be prevented from being estimated by another coin user even when the job history of the coin user is displayed.

In a case in which the view setting of job history of the coin user is OFF, when the CPU 201 receives a job of the coin user or stores the job history of the coin user, the CPU 201 can replace information, such as a job name of the job, from which job content may be estimated with other information. By replacing information, such as a job name, from which job content can be estimated with information from which job content cannot be estimated, the job content can be prevented from being estimated by another coin user even when the job history of the coin user is displayed.

While an image forming apparatus including a charging device (coin vender) is described in the above embodiment, the present disclosure can be applied to an image forming apparatus that does not include a coin vender. For example, in one situation, users can be logged into an image forming apparatus as "guest" users In this case, login is performed using a "guest" ID with no password. In the same manner as the coin user described above, the guest user is considered part of an unspecified large number of users of the MFP 1 (the second type user). In a configuration where an ID user uses, to be logged in, an IC card where user identification information assigned for each user in advance is registered, when a user logs in using an IC card for a guest user, the user can be logged in as a guest user. In this case, the same control described above as performed on a coin user who uses the charging device (coin vender) is applicable to the guest user. In other words, while preventing job histories of second type users, which are an unspecified large number of users such as users who use a coin vender and guest users, from being referred to, a first type user, which is one of fixed users of the image forming apparatus, can refer to the user's own job history. Thereby, security of and convenience of use of the job history are achieved.

While the present embodiment is described using a composite machine such as an MFP, the present disclosure can also be applied to a printing apparatus such as a printer.

As described above, while preventing users' job histories from be referred to by an unspecified large number of users such as users who use a coin vender, users who have performed user authentication or the like, i.e., fixed users, can refer to the user's own job history. Thereby, even though both fixed users and an unspecified large number of users can use an image forming apparatus, security of and convenience of use of the job history are achieved.

For example, when the MFP 1 is installed in school, an environment can be established where a user who does not use a coin vender (a staff member or the like) can refer to the user's own job history, while a user who does use the coin vender (a student or the like) cannot refer to job histories. Therefore, a job history of a user who uses the coin vender (a student or the like) is prevented from being referred to by another user while securing convenience related to the job history for a user who does not use the coin vender (a staff member or the like).

According to the present disclosure, even when both fixed users and an unspecified large number of users use the same image forming apparatus, security of and convenience of use of the job history are achieved.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-079061, filed Apr. 12, 2017, which is hereby incorporated by reference herein in its entirety.

What is claimed is:

1. An image forming apparatus connected to a charging device, the image forming apparatus comprising:
    at least one processor executing instructions configured to act as units including,
        a processing unit configured to process a print job having at least two job items associated therewith and record a value for each of the at least two job items, wherein the at least two job items include a job name and a result whether the print job having the job name is successfully processed or not;
        an authentication unit configured to perform user authentication, wherein printing is allowed if a user who is to execute a print job is successfully authenticated as a predetermined authenticated user or identified as a prepaid user who has paid for printing, and the prepaid user does not need authentication to use the image forming apparatus; and
        a control unit configured to
            in response to receiving a request to display a job history from the prepaid user, control a display not to display any job history at all, thereby no recorded values for respective job items for any print job are displayed,
            in response to receiving a request to display a job history from the predetermined authenticated user, control the display to display a job history of one or more print jobs instructed to be processed by the predetermined authenticated user, wherein the job history includes the recorded values for the at least two job items for the one or more print jobs.

2. The image forming apparatus according to claim 1, wherein the control unit controls the display of job information by not displaying the job information or by masking at least a part of the job information.

3. The image forming apparatus according to claim 1, wherein the job information includes at least any one or more of a job name, a user name of the job, and an execution date and time of the job.

4. The image forming apparatus according to claim 1, wherein the job information is a job history.

5. A control method for an image forming apparatus connected to a charging device, the control method comprising:
   processing a print job having at least two job items associated therewith and record a value for each of the at least two job items, wherein the at least two job items include a job name and a result whether the print job having the job name is successfully processed or not;
   performing user authentication wherein printing is allowed if a user who is to execute a print job is successfully authenticated as a predetermined authenticated user or identified as a prepaid user who has paid for printing, and the prepaid user does not need authentication to use the image forming apparatus;
   controlling, in response to receiving a request to display a job history from the prepaid user, a display not to display any job history at all thereby not recorded values for respective job items for any print job are displayed; and
   controlling, in response to receiving a request to display a job history from the predetermined authenticated user, the display to display a job history of one or more print jobs instructed to be processed by the predetermined authenticated user, wherein the job history includes the recorded values for the at least two job items for the one or more print jobs.

6. The control method according to claim 5, wherein controlling the display of job information includes not displaying the job information or masking at least a part of the job information.

7. The control method according to claim 5, wherein the job information includes at least any one or more of a job name, a user name of the job, and an execution date and time of the job.

8. The control method according to claim 5, wherein the job information is a job history.

9. An image forming apparatus connected to a charging device, the image forming apparatus comprising:
   at least one processor executing instructions configured to act as units including,
      a processing unit configured to process a print job having at least two job items associated therewith and record a value for each of the at least two job items, wherein the at least two job items include a user name of a user who has instructed to process the print job and a result whether the print job is successfully processed or not;
      an authentication unit configured to perform user authentication, wherein printing is allowed if a user who is to execute a print job is successfully authenticated as a predetermined authenticated user or identified as a prepaid user who has paid for printing, and the prepaid user does not need authentication to use the image forming apparatus; and
      a control unit configured to
         in response to receiving a request to display a job history from the prepaid user, control a display not to display any job history at all, thereby no recorded values for respective job items for any print job are displayed,
         in response to receiving a request to display a job history from the predetermined authenticated user, control the display to display a job history of one or more print jobs instructed to be processed by the predetermined authenticated user, wherein the job history includes the recorded values for the at least two job items for the one or more print jobs.

10. A control method for an image forming apparatus connected to a charging device, the control method comprising:
   processing a print job having at least two job items associated therewith and record a value for each of the at least two job items, wherein the at least two job items include a user name of a user who has instructed to process the print job and a result whether the print job is successfully processed or not;
   performing user authentication wherein printing is allowed if a user who is to execute a print job is successfully authenticated as a predetermined authenticated user or identified as a prepaid user who has paid for printing, and the prepaid user does not need authentication to use the image forming apparatus;
   controlling, in response to receiving a request to display a job history from the prepaid user, a display not to display any job history at all thereby not recorded values for respective job items for any print job are displayed; and
   controlling, in response to receiving a request to display a job history from the predetermined authenticated user, the display to display a job history of one or more print jobs instructed to be processed by the predetermined authenticated user, wherein the job history includes the recorded values for the at least two job items for the one or more print jobs.

* * * * *